(12) United States Patent
Ettireddy et al.

(10) Patent No.: US 8,640,714 B2
(45) Date of Patent: Feb. 4, 2014

(54) ORAL CHEWABLE TOBACCO PRODUCT AND METHOD OF MANUFACTURE THEREOF

(75) Inventors: Padmanabha Reddy Ettireddy, Columbus, IN (US); Sarojini Deevi, Midlothian, VA (US); Shengsheng Liu, Richmond, VA (US); Munmaya K. Mishra, Manakin Sabot, VA (US); William R. Sweeney, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 508 days.

(21) Appl. No.: 12/617,375

(22) Filed: Nov. 12, 2009

(65) Prior Publication Data

US 2011/0108043 A1    May 12, 2011

(51) Int. Cl.
*A24B 15/00* (2006.01)

(52) U.S. Cl.
USPC .......................................................... 131/352

(58) Field of Classification Search
USPC .......................................................... 131/352
See application file for complete search history.

(56) References Cited

U.S. PATENT DOCUMENTS

| | | | |
|---|---|---|---|
| 865,026 A | 9/1907 | Ellis | |
| 904,521 A | 11/1908 | Ellis | |
| 1,376,586 A | 5/1921 | Schwartz | |
| 3,747,608 A | 7/1973 | Gravely et al. | |
| 3,974,838 A | 8/1976 | Mitchell et al. | |
| 4,307,733 A | 12/1981 | Teng et al. | |
| 4,317,837 A | 3/1982 | Kehoe et al. | |
| 4,379,169 A | 4/1983 | Reggio et al. | |
| 4,407,307 A | 10/1983 | Gaisch et al. | |
| 4,476,881 A | 10/1984 | Gravely et al. | |
| 4,537,204 A | 8/1985 | Gaisch et al. | |
| 4,545,392 A | 10/1985 | Sensabaugh, Jr. et al. | |
| 4,572,219 A | 2/1986 | Gaisch et al. | |
| 4,606,357 A | 8/1986 | Dusek et al. | |
| 4,624,269 A | 11/1986 | Story et al. | |

(Continued)

FOREIGN PATENT DOCUMENTS

EP    1148107 A1    10/2001
WO    WO 2005/046363 A2    5/2005

(Continued)

OTHER PUBLICATIONS

Search Report mailed Mar. 17, 2011 for International Application No. PCT/EP2010/006849.

(Continued)

*Primary Examiner* — Richard Crispino
*Assistant Examiner* — Dionne Walls Mayes
(74) *Attorney, Agent, or Firm* — Buchanan Ingersoll & Rooney PC

(57) ABSTRACT

An oral chewable tobacco product includes a gum composition in an amount of about 30% to about 70% by weight based on the weight of the oral chewable tobacco product and tobacco powder in an amount of about 30% to about 70% by weight based on the weight of the oral chewable tobacco product. The gum composition includes at least one environmentally biodegradable polymer in an amount of about 20% to about 95% by weight based on the weight of the gum composition and at least one softener in an amount of about 5% to about 80% by weight based on the weight of the gum composition.

20 Claims, 1 Drawing Sheet

(56) References Cited

U.S. PATENT DOCUMENTS

| | | |
|---|---|---|
| 4,709,710 A | 12/1987 | Gaisch et al. |
| 4,802,498 A | 2/1989 | Ogren |
| 4,887,618 A | 12/1989 | Bernasek et al. |
| 4,907,605 A | 3/1990 | Ray et al. |
| 4,917,161 A | 4/1990 | Townend |
| 4,941,484 A | 7/1990 | Clapp et al. |
| 5,092,352 A | 3/1992 | Sprinkle, III et al. |
| 5,343,879 A | 9/1994 | Teague |
| 5,387,416 A | 2/1995 | White et al. |
| 5,482,722 A | 1/1996 | Cook |
| 5,601,097 A | 2/1997 | De Grandpre et al. |
| 5,740,016 A | 4/1998 | Dhindsa |
| 5,752,529 A | 5/1998 | Mane et al. |
| 5,803,081 A | 9/1998 | O'Donnell, Jr. et al. |
| 6,194,008 B1 | 2/2001 | Li et al. |
| 6,571,801 B1 | 6/2003 | Wuolukka et al. |
| 6,613,363 B1 | 9/2003 | Li |
| 6,645,470 B1 | 11/2003 | Reynolds |
| 7,032,601 B2 | 4/2006 | Atchley et al. |
| 7,819,124 B2 * | 10/2010 | Strickland et al. ............ 131/352 |
| 2004/0028772 A1 | 2/2004 | Andersen |
| 2004/0101543 A1 | 5/2004 | Liu et al. |
| 2004/0118421 A1 | 6/2004 | Hodin et al. |
| 2004/0118422 A1 | 6/2004 | Lundin et al. |
| 2004/0182403 A1 | 9/2004 | Andersson et al. |
| 2005/0244521 A1 | 11/2005 | Strickland et al. |
| 2005/0244538 A1 | 11/2005 | Andersen et al. |
| 2006/0051455 A1 | 3/2006 | Andersen et al. |
| 2006/0099300 A1 | 5/2006 | Andersen et al. |
| 2006/0147498 A1 | 7/2006 | Jonsson et al. |
| 2006/0147580 A1 | 7/2006 | Nissen et al. |
| 2006/0191548 A1 | 8/2006 | Strickland et al. |
| 2007/0084476 A1 | 4/2007 | Yang et al. |
| 2007/0186942 A1 | 8/2007 | Strickland et al. |
| 2007/0186943 A1 | 8/2007 | Strickland et al. |
| 2008/0029117 A1 | 2/2008 | Mua et al. |
| 2009/0133704 A1 | 5/2009 | Strickland et al. |
| 2010/0291245 A1 | 11/2010 | Gao et al. |

FOREIGN PATENT DOCUMENTS

| | | |
|---|---|---|
| WO | WO2006000233 | 1/2006 |
| WO | WO2006004480 A1 | 1/2006 |
| WO | WO2006065192 A1 | 6/2006 |
| WO | WO 2006/127772 A2 | 11/2006 |
| WO | WO 2009/048522 A1 | 4/2009 |

OTHER PUBLICATIONS

International Preliminary Report on Patentability issued May 15, 2012 for PCT/EP2010/006849.

* cited by examiner

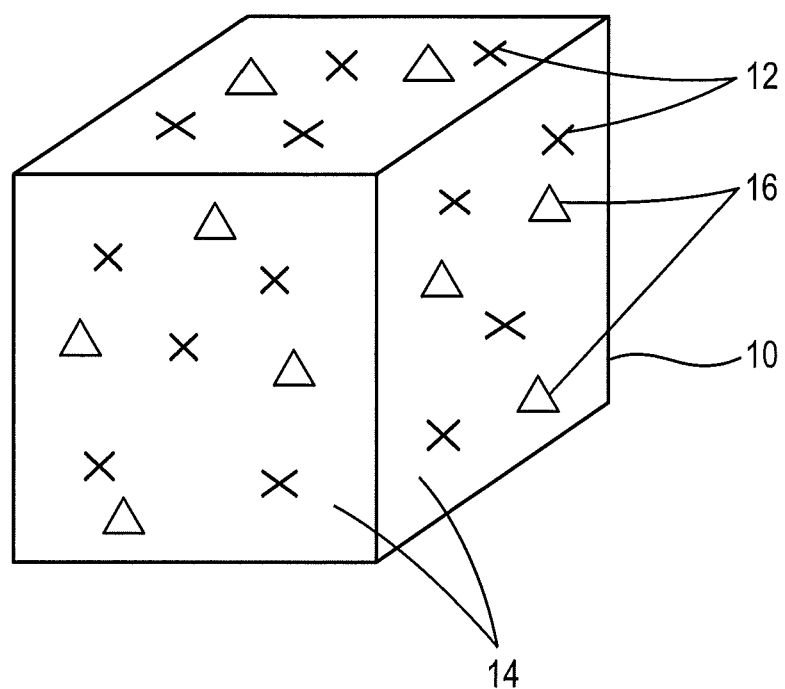

ORAL CHEWABLE TOBACCO PRODUCT AND METHOD OF MANUFACTURE THEREOF

SUMMARY

A chewable and at least partially disintegrable oral tobacco product includes tobacco powder in an amount sufficient to form about 30% to about 70% by weight based on the weight of the oral chewable tobacco product and a gum composition comprising at least one polymer in an amount of about 20% to about 95% by weight based on the weight of the gum composition and at least one softener in an amount of about 5% to about 80% by weight based on the weight of the gum composition. Preferably, the gum composition is included in an amount of about 70% to about 30% by weight based on the weight of the oral chewable tobacco product. The oral chewable tobacco product is at least partially disintegrable in the oral cavity and at least partially environmentally biodegradable. Preferably, the gum composition is at least partially environmentally biodegradable and at least partially water soluble and the at least one polymer is at least partially environmentally biodegradable. Also preferably, the polymer is selected from the group consisting of corn zein, polycaprolactone, polycaprolactone diol, polylactides, polyesters, polycarbonates, polypeptides, polyglycolides, and combinations thereof. Most preferably, the polymer is a protein, such as corn zein.

BRIEF DESCRIPTION OF THE DRAWINGS

FIG. 1 is a schematic diagram illustrating an embodiment of an oral chewable tobacco product as described herein.

DETAILED DESCRIPTION

An oral chewable tobacco product that is at least partially disintegrable in an oral cavity of a user and/or at least partially environmentally degradable, includes a majority amount of tobacco and a gum composition that is at least partially biodegradable and/or at least partially water soluble, is described herein.

Additionally, the oral chewable tobacco product described herein includes a majority amount of tobacco such that the flavor of the tobacco is not compromised by the addition of an at least partially biodegradable and/or at least partially water soluble gum composition.

As used herein, the terms "gum composition" and "gum compositions" refers to gum compositions described herein, which are at least partially biodegradable and/or at least partially water soluble. In the preferred embodiment, the gum composition biodegrades in the environment in less than about 30 days. These gum compositions include compositions, which are soft and retain softness after exposure to the atmosphere.

As used herein, the terms "biodegradable" and "biodegrade" describe the quality of being degradable when exposed to the biosphere and environmental conditions typically occurring therein. Degradation may be accomplished by the action of microorganisms, by chemical mechanisms, or other mechanisms, alone or in combination with each other. As used herein, the term is not limited to a particular environment, but rather is intended to denote degradation in any environment in which degradation can occur. It will be understood that, in some environments, most biodegradable materials will degrade and/or disintegrate more rapidly than in some other environments. When comparative statements regarding degradation speed or extent are made herein, it is intended that the environment be kept constant for the comparison.

Suitable biodegradable and chewable gum compositions that are at least partially biodegradable and/or at least partially water soluble can be formulated using natural and/or synthetic polymers and softeners that are substantially water soluble. In the preferred embodiment, the gum composition consists essentially of at least one of the polymers listed below and at least one softener Preferably, the polymers used in the gum composition are at least partially environmentally biodegradable. In an embodiment, the polymers can be at least partially water soluble. Suitable polymers include, without limitation, food proteins such as plant-based proteins including corn zein, pea protein, rice protein or combinations thereof. Other suitable polymers for use in formulating the gum composition include, without limitation, polycaprolactone, polycaprolactone diol, polylactides, polyesters, polycarbonates, polypeptides and polyglycolides. Preferably, the polymer is corn zein, which is a class of prolamine protein found in maize. In the preferred embodiment, the desired polymer is included in the gum composition in an amount of about 20% to about 95% by weight based on the weight of the gum composition, more preferably about 20% to about 60% by weight based on the weight of the gum composition and most preferably about 20% to about 40% by weight based on the weight of the gum composition. Preferably, the polymer is included in the oral chewable tobacco product in an amount of about 5% to about 50% by weight based on the weight of the oral chewable tobacco product (e.g. about 5% to about 10%, about 10% to about 20%, about 20% to about 30%, about 30% to about 40% or about 40% to about 50%).

Preferably, the at least partially biodegradable and/or at least partially water soluble gum composition also includes at least one softener, which acts to slow hardening of the gum composition, prevents grittiness of the gum composition and/or aids in maintaining softness of the gum composition when exposed to ambient conditions. Examples of suitable softeners include, but are not limited to, propylene glycol, glycerin, glycerol, polyethylene glycols and polyethylene glycol copolymers, glycerin fatty acid esters, acetic acid esters of monoglycerides, lactic acid esters of monoglycerides, citric acid esters of monoglycerides, succinic acid esters of monoglycerides, diacetyl tartaric acid esters of monoglycerides, polyglycerol esters of fatty acids, polyglycerol polyricinoleate, sorbitan esters of fatty acids, propylene glycol esters of fatty acids, sucrose esters of fatty acids, calcium stearoyl di laciate, lecithin, oils, such as vegetable oil, sunflower oil and peanut oil and honey. Preferably, the at least one softener is included in the gum composition in an amount of about 5% to about 80% by weight based on the weight of the gum composition, more preferably ranges from about 10% to about 70% by weight based on the weight of the gum composition, and most preferably about 15% to about 60% by weight based on the weight of the gum composition (e.g., about 5% to about 40%, about 10% to about 35%, about 15% to about 30% or about 20% to about 25%). Also preferably, the softener is included in the oral chewable tobacco product in an amount of about 5% to about 50% by weight based on the weight of the oral chewable tobacco product.

As used herein, the terms "soft," "soften" and "softness" describes the chewable tobacco product in a malleable and/or elastic state.

The following examples of gum compositions suitable for use in the chewable and disintegrable oral tobacco products described herein are exemplary and are not meant to limit any aspects of the embodiments disclosed herein.

Example 1

Corn zein in an amount sufficient to form about 40% by weight based on the weight of the gum composition is dissolved in 50 mL ethanol to form a solution. The solution is stirred for about 30 minutes at a temperature of about 60° C. until the solution forms a homogenous paste. The paste is cooled to room temperature. Glycerin in an amount sufficient to form about 20% by weight based on the weight of the gum composition and glycerol in an amount sufficient to form about 40% by weight based on the weight of the gum composition are added to the paste as softeners to form a gum composition. The gum composition maintains its softness and/or pliability for at least one week when left exposed to ambient atmospheric conditions.

Example 2

Corn zein in an amount sufficient to form about 40% by weight based on the gum composition is dissolved in 50 mL ethanol to form a solution. The solution is stirred for about 30 minutes at a temperature of about 60° C. until the solution forms a homogenous paste. The paste is cooled to room temperature. Propylene glycol in an amount sufficient to form about 20% by weight based on the weight of the gum composition and lecithin in an amount sufficient to form about 40% by weight based on the weight of the gum composition are added to the paste as softeners to form a gum composition. The gum composition maintains its softness and/or pliability for at least one week when left exposed to ambient atmospheric conditions.

Example 3

Corn zein in an amount sufficient to form about 30% by weight based on the gum composition is dissolved in 50 mL ethanol to form a solution. The solution is stirred for about 30 minutes at a temperature of about 60° C. until the solution forms a homogenous paste. The paste is cooled to room temperature. Propylene glycol in an amount sufficient to form about 10% by weight based on the weight of the gum composition, glycerin in an amount sufficient to form about 10% by weight based on the weight of the gum composition, glycerol in an amount sufficient to form about 20% by weight based on the weight of the gum composition and lecithin in an amount sufficient to form about 30% by weight based the weight of the gum composition are added to the paste as softeners to form a gum composition. The gum composition maintains its softness and/or pliability for at least one week when left exposed to ambient atmospheric conditions.

Example 4

Corn zein in an amount sufficient to form about 40% by weight based on the weight of the gum composition and polycaprolactone diol in an amount sufficient to form about 40% by weight based on the weight of the gum composition are dissolved in 50 mL ethanol to form a solution. The solution is stirred for about 30 minutes at a temperature of about 60° C. until the solution forms a homogenous paste. The paste is cooled to room temperature. Glycerin in an amount sufficient to form about 20% by weight based the weight of the gum composition is added to the paste as a softener to form a gum composition. The gum composition maintains its softness and/or pliability for at least one week when left exposed to ambient atmospheric conditions.

Example 5

Corn zein in an amount sufficient to form about 40% by weight based on the weight of the gum composition and polycaprolactone diol in an amount sufficient to form about 40% by weight based on the weight of the gum composition are dissolved in 50 mL ethanol to form a solution. The solution is stirred for about 30 minutes at a temperature of about 60° C. until the solution forms a homogenous paste. The paste is cooled to room temperature. Glycerin in an amount sufficient to form about 10% by weight based on the weight of the gum composition and sunflower oil in an amount sufficient to form about 10% by weight based on the weight of the gum composition are added to the paste as softeners to form a gum composition. The gum composition maintains its softness and/or pliability for at least one week when left exposed to ambient atmospheric conditions.

Example 6

Polycaprolactone in an amount sufficient to form about 40% by weight based on the weight of the gum composition is dissolved in 50 mL ethanol to form a solution. The solution is stirred for about 30 minutes at a temperature of about 60° C. until the solution forms a homogenous paste. The paste is cooled to room temperature. Polyethylene glycol-block-polypropylene glycol-block-polyethylene glycol, a softener, in an amount sufficient to form about 40% by weight based on the weight of the gum composition and propylene glycol in an amount sufficient to form about 20% by weight based on the weight of the gum composition are added to the paste as softeners to form a gum composition. The gum composition maintains its softness and/or pliability for at least one week when left exposed to ambient atmospheric conditions.

Example 7

Corn zein in an amount sufficient to form about 30% by weight based on the weight of the gum composition is dissolved in about 50 mL of ethanol. The solution is stirred for about 30 minutes at a temperature of about 60° C. until the solution forms a homogenous paste. The paste is cooled to room temperature. Distilled monoglycerides in an amount sufficient to form about 6% by weight based on the weight of the gum composition, lactic acid esters of mono- and di-glycerides in an amount sufficient to form about 4% by weight based on the weight of the gum composition, lecithin in an amount sufficient to form about 30% by weight based on the weight of the gum composition and propylene glycol in an amount sufficient to form about 30% by weight based on the weight of the gum composition are added to the paste as softeners to form a gum composition. The gum composition maintains its softness and/or pliability for at least one week when left exposed to ambient atmospheric conditions.

The gum compositions described in Examples 1-7 incorporating at least partially biodegradable and/or at least partially water soluble polymers are useful in forming oral chewable tobacco products described herein. Preferably, the gum compositions maintain their softness for an extended period of time. Preferably, the gum compositions maintain their softness for at least about 2 days, at least about 4 days, at least about 6 days and/or at least about 1 week when left exposed to atmospheric conditions.

As shown in FIG. 1, an oral tobacco product 10 is in the form of a matrix that includes tobacco 12 and a gum composition comprising one or more polymers 14 that are at least partially biodegradable and/or at least partially water soluble and at least one softener. In a preferred embodiment, the oral tobacco product 10 is chewable and disintegrable in a user's mouth and at least partially environmentally biodegradable.

In a preferred embodiment, the oral chewable tobacco product 10 is pre-portioned to create individual pieces of the oral chewable tobacco product 10. Preferably, each pre-portioned piece of the oral chewable tobacco product 10 is sized and configured to fit comfortably in the user's mouth. Preferably, if the oral chewable tobacco product 10 has edges, the edges are soft edges.

The oral chewable tobacco product 10 may be formed in many shapes including, without limitation, spheres, rectangles, oblong shapes, crescent shapes, star shapes, tea leaf shapes, ovals, and cubes. In a preferred embodiment, the oral tobacco product is rectangular and weighs about 0.5 g to 4.0 g, and more preferably about 1.0 g to about 3.0 g. The pre-portioned oral chewable tobacco product 10 may be up to about 1.5 inches long, up to 1.5 inches in height, and up to 1.5 inches in width. More preferably, the pre-portioned oral chewable tobacco product 10 is up to about 1 inches long, up to about 1 inches in height and up to about 1 inches in width. Most preferably, the pre-portioned oral chewable tobacco product 10 ranges from about 0.1 inches to about 1.5 inches long, about 0.05 inches to about 1.5 inches in height and about 0.1 inches to about 1.5 inches in width.

Preferably, the oral chewable tobacco product 10 is at least partially disintegrable in the oral cavity and environmentally biodegrades. Also preferably, the oral chewable tobacco product 10 dissolves and/or disintegrates in the mouth after chewing. In a preferred embodiment, the oral chewable tobacco product 10 dissolves and/or disintegrates in the mouth and can be chewed for about 30 seconds to about 60 minutes, more preferably about 5 minutes to about 40 minutes, and most preferably about 10 minutes to about 20 minutes. In another embodiment, the oral chewable tobacco product 10 can be removed from the mouth and at least partially disintegrates when exposed to environmental conditions. In the preferred embodiment, the oral chewable tobacco product substantially biodegrades in the environment in less than about 30 days, more preferably in less than about 20 days, and most preferably in less than about 10 days (e.g., less than about 9 days, less than about 8 days, less than about 7 days, less than about 6 days, less than about 5 days, less than about 4 days, less than about 3 days, less than about 2 days or less than about 1 day).

In a preferred embodiment, the tobacco 12 is in the form of a tobacco powder. As used herein, the term "tobacco powder" describes dust, fines, granules, dried tobacco extract and smaller than about 400 mesh. Preferably, the tobacco is dry tobacco and does not include any casing (uncased tobacco). Also preferably, the tobacco has a moisture content of less than about 5%. Thus, the amount of tobacco included in the oral chewable tobacco product 10 is based substantially on the weight of the tobacco alone.

All mesh values are reported herein as United States standard sieve and those values reflect the ability of more than 95% of the particles of a given size to pass through a screen of a given mesh value. In that connection, mesh values reflect the number of mesh holes for each inch of screen.

Preferably, the tobacco 12 is included in the oral chewable tobacco product 10 in an amount of about 30% to about 70% by weight based on the weight of the oral chewable tobacco product 10 so that the tobacco flavor is not compromised and/or overpowered by inclusion of the gum composition (e.g., about 30% to about 40%, about 40% to about 50%, about 50% to about 60% or about 60% to about 70%). Preferably, the amount of tobacco used does not interfere with the elastic and/or biodegradable properties of the gum composition despite using a majority amount of tobacco material.

Examples of suitable types of tobacco materials that can be used in the oral chewable tobacco product 10 include, but are not limited to, flue-cured tobacco, air-cured, Burley tobacco, Maryland tobacco, Oriental tobacco, rare tobacco, specialty tobacco, blends thereof and the like. The tobacco material may be provided in any suitable form, including, but not limited to, tobacco lamina, processed tobacco materials such as volume expanded or puffed tobacco, aged tobacco, processed tobacco stems, such as cut-rolled or cut-puffed stems, reconstituted tobacco materials, blends thereof, and the like. The tobacco may also be genetically modified tobacco or tobacco having a reduced tobacco specific nitrosamine (TSNA) content. Preferably, the tobacco is ground to produce a powder for incorporation in the oral tobacco product.

In an embodiment, the oral chewable tobacco product 10 can include a non-tobacco flavorant. Preferably, about 0.1 mg to about 100 mg of a flavorant is added to the oral chewable tobacco product 10. The amount of flavorant added can depend on the type or potency of the flavorant being added, but is preferably added in an amount of up to about 5% by weight based on the weight of the oral chewable tobacco product (e.g., up to about 4%, up to about 3%, up to about 2% or up to about 1%). In an embodiment, the oral chewable tobacco product 10 can include multiple flavorants.

Suitable flavorants include any flavorants commonly used in foods, confections, smokeless tobacco products, tobacco articles, and/or other oral products. Exemplary flavorants include, but are not limited to, berry flavors such as pomegranate, acai, raspberry, blueberry, strawberry, boysenberry, and/or cranberry. Other suitable flavorants include, without limitation, any natural or synthetic flavor or aroma, such as menthol, peppermint, spearmint, wintergreen, bourbon, scotch, whiskey, cognac, hydrangea, lavender, chocolate, licorice, citrus and other fruit flavors, such as apple, peach, pear, cherry, plum, orange, lime, grape, and grapefruit, gamma octalactone, vanillin, ethyl vanillin, breath freshener flavors, butter, rum, coconut, almond, pecan, walnut, hazelnut, French vanilla, macadamia, sugar cane, maple, cassis, caramel, banana, malt, espresso, kahlua, white chocolate, spice flavors such as cinnamon, clove, cilantro, basil, oregano, garlic, mustard, nutmeg, rosemary, thyme, tarragon, dill, sage, anise, and fennel, methyl salicylate, linalool, jasmine, coffee, olive oil, sesame oil, sunflower oil, bergamot oil, geranium oil, lemon oil, ginger oil, balsamic vinegar, rice wine vinegar, and red wine vinegar.

Preferably, the flavorants are applied to the oral chewable tobacco product 10 by spraying, coating, immersing, embossing, and/or dispersing flavorants into or onto the oral chewable tobacco product 10. In an embodiment, the flavorants are added in the form of spray dried flavorants, essential oils, encapsulated flavorants, coacervated flavorants, colloidal encapsulated flavorants, suspensions, and/or solutions.

When the flavorants are encapsulated, the flavorants can also be provided by controlled release mechanisms such as pH change, heat activation, or mechanical activation through manipulating or sucking. In addition, flavorant capsules can have encapsulating coatings of various thicknesses so that the flavorants are released at varying rates to provide continuous or different flavor throughout use of the oral tobacco product.

In a preferred embodiment, other additives 14 can be included, such as vitamins, minerals, nutraceuticals, energizing agents, soothing agents, sweeteners, coloring agents, amino acids, chemesthesis agents, antioxidants, and/or combinations thereof. The additives can be included in an amount of up to about 5% by weight based on the weight of the oral chewable tobacco product 10.

In an embodiment, suitable sweeteners include, without limitation, monosaccharides, disaccharides, and polysaccharides, xylose, ribose, sucrose, maltose, mannitol, sorbitol, xylitol, fructose, glucose, mannose and combinations thereof.

Preferably, soothing agents are included to provide a soothing sensation to the throat and oral cavity. Suitable soothing agents include, without limitation, chamomile, lavender, jasmine, and the like.

Suitable energizing ingredients, without limitation, caffeine, taurine, and guarana.

Suitable vitamins include, without limitation, vitamin A (retinol), vitamin D (cholecalciferol), vitamin E group, vitamin K group (phylloquinones and menaquinones), thiamine (vitamin $B_1$), riboflavin (vitamin $B_2$), niacin, niacinamide, pyridoxine (vitamin $B_6$ group), folic acid, choline, inositol, vitamin $B_{12}$ (cobalamins), PABA (para-aminobezoic acid), biotin, vitamin C (ascorbic acid), and mixtures thereof. The amount of vitamins incorporated into an chewable foam product can be varied according to the type of vitamin and the intended user of the chewing foam product. For example, the amount of vitamins may be formulated to include an amount less than or equal to the recommendations of the United States Department of Agriculture Recommended Daily Allowances.

Suitable chemesthesis ingredients provide, without limitation, hot, spicy, or cooling flavors. Suitable chemesthesis agents include, without limitation, capsaicin, tannins, mustard oil, wintergreen oil, cinnamon oil, allicin, quinine, citric acid, and salt.

As used herein, the term "nutraceuticals" refers to any ingredient in foods that has a beneficial effect on human health. Nutraceuticals include particular compounds/compositions isolated from natural food sources and genetically modified food sources. For example, nutraceuticals include various phytonutrients derived from natural plants and genetically engineered plants.

Suitable minerals include, without limitation, calcium, magnesium, phosphorus, iron, zinc, iodine, selenium, potassium, copper, manganese, molybdenum, chromium, and mixtures thereof. The amount of minerals incorporated into the oral tobacco product can be varied according to the type of vitamin and the intended user. For example, the amount of minerals may be formulated to include an amount less than or equal to the recommendations of the United States Department of Agriculture Recommended Daily Allowances.

Suitable amino acids include, without limitation, the eight essential amino acids that cannot be biosynthetically produced in humans, including valine, leucine, isoleucine, lysine, threonine, tryptophan, methionine, and phenylalanine. Examples of suitable amino acids include the non-essential amino acids including alanine, arginine, asparagine, aspartic acid, cysteine, glutamic acid, glutamine, glycine, histidine, proline, serine, and tyrosine.

In another embodiment, the oral chewable tobacco product 10 can include various active agents having antioxidant properties that can delay the ageing process, as food-grade ingredients. For example, the active ingredients that can be extracted from *Ginkgo biloba* include flavonoid glycosides ("ginkgoflavonoids"), such as (iso)quercitin, kaempferol, kaempferol-3-rhamnosides, isorhamnetin, luteolin, luteolin glycosides, sitosterol glycosides, and hexacyclic terpene lactones, referred to as "ginkgolides" or "bilobalides." The active ingredients that can be extracted from *Camellia sinensis*, such as green tea, include various "tea tannins," such as epicatechol, epigallocatechol, epigallocatechol gallate, epigallocatechol gallate, theaflavin, theaflavin monogallate A or B, and theaflavin digallate. The active ingredients that can be extracted from *Vaccinium myrtillus*, such as blueberry, include at least 15 different anthocyanosides, such as delphinidin, anthocyanosides, myrtin, epimyrtin, phenolic acids, glycosides, quercitrin, isoquercitrin, and hyperoside. The active ingredients that can be extracted from *Vinis vitifera*, such as grapes, include polyphenols, catechols, quercitrins, and resveratrols. The active ingredients that can be extracted from *Olea europensis*, such as the leaves of olive trees, include oleuropein. Many active ingredients identified from these and other plant sources associated with the neutralization of free radicals and useful for delaying the ageing process are contemplated.

The active ingredients of *Trifolium pratense*, such as purple clovers (i.e., common purple trefoils), include isoflavones or isoflavone glucosides, daidzein, genestein, formononentin, biochanin A, ononin, and sissostrin. The health-promoting properties of compounds derived from Panax, a genus that includes Ginseng, are well-established. These and other botanicals, botanical extracts, and bioactive compounds having health promoting effects are contemplated.

The botanical extracts may be prepared by various methods known in the art, including maceration, remaceration, digestion, agitation maceration, vortex extraction, ultrasonic extraction, countercurrent extraction, percolation, repercolation, evacolation, diacolation, and solid/liquid extraction under continuous reflux. Other antioxidants known in the art are also contemplated.

The following examples are exemplary and are not meant to limit any aspects of the embodiments disclosed herein.

Example 8

An oral chewable tobacco product is made by combining tobacco powder with a gum composition solution. The solution is prepared by dissolving corn zein in an amount sufficient to form about 15% by weight based the weight of the oral tobacco product in 50 mL ethanol to form a solution. The solution is stirred at 60° C. for about 15 minutes. Burley tobacco powder having dimensions of less than about 400 mesh is added in an amount sufficient to form about 60% by weight based on the weight of the oral chewable tobacco product to the solution, which is then stirred for about 30 minutes until the mixture becomes a homogeneous paste. The paste is cooled to room temperature. Glycerin in an amount sufficient to form about 10% by weight based the weight of the oral chewable tobacco product and lactic acid esters of mono- and di-glycerides in an amount sufficient to form about 15% by weight based the weight of the oral chewable tobacco product are added to the paste as softeners. The paste is formed into a dough. The dough is portioned to form the oral chewable tobacco product.

Example 9

An oral tobacco product is made by combining tobacco powder with a gum composition solution. The solution is prepared by dissolving corn zein in an amount sufficient to form about 15% by weight based on the weight of the oral chewable tobacco product in 50 mL ethanol to form a solution. The solution is stirred at 60° C. for about 15 minutes. Burley tobacco powder is added in an amount sufficient to form about 60% by weight based on the weight of the oral chewable tobacco product to the solution, which is then stirred for about 30 minutes until the mixture becomes a homogeneous paste. The paste is cooled to room temperature and propylene glycol in an amount sufficient to form about 10% by weight based the weight of the oral chewable tobacco product and lecithin in an amount sufficient to form about 15% by weight based on the weight of the oral chewable tobacco product are added to the paste as softeners. The paste is formed into a dough. The dough is portioned to form the oral chewable tobacco product.

Example 10

An oral chewable tobacco product is made by combining tobacco powder with a gum composition solution. The solution is prepared by dissolving corn zein in an amount sufficient to form about 13% by weight based on the weight of the oral tobacco product in 50 mL ethanol to form a solution. The solution is stirred at 60° C. for about 15 minutes. Burley tobacco powder is added in an amount sufficient to form about 60% by weight based on the weight of the oral chewable tobacco product to the solution, which is then stirred for about 30 minutes until the mixture becomes a homogeneous paste. The paste is cooled to room temperature and propylene glycol/glycerin in an amount sufficient to form about 10% by weight based on the weight of the oral chewable tobacco product, lecithin in an amount sufficient to form about 13% by weight based on the weight of the oral chewable tobacco product and lactic acid esters of mono- and di-glycerides in an amount sufficient to form about 4% by weight based on the weight of the oral chewable tobacco product are added to the paste as softeners. The paste is formed into a dough. The dough is portioned to produce the oral chewable tobacco product.

Example 11

An oral chewable tobacco product is made by combining tobacco powder with a gum composition solution. The solution is prepared by dissolving corn zein in an amount sufficient to form about 15% by weight based on the weight of the oral chewable tobacco product and polycaprolactone diol in an amount sufficient to form about 15% by weight based on the weight of the oral chewable tobacco product in 50 mL ethanol to form a solution. The solution is stirred at 60° C. for about 15 minutes. Burley tobacco powder is added in an amount sufficient to form about 60% by weight based on the weight of the oral chewable tobacco product to the solution, which is then stirred for about 30 minutes until the mixture becomes a homogeneous paste. The paste is cooled to room temperature and glycerin in an amount sufficient to form about 10% by weight based on the weight of the oral chewable tobacco product is added to the paste as a softener. The paste is formed into a dough. The dough is portioned to produce the oral chewable tobacco product.

Example 12

An oral chewable tobacco product is made by combining tobacco powder with a gum composition solution. The solution is prepared by dissolving corn zein in an amount sufficient to form about 15% by weight based on the weight of the oral tobacco product and polycaprolactone diol in an amount sufficient to form about 15% by weight based on the weight of the oral chewable tobacco product in 50 mL ethanol to form a solution. The solution is stirred at 60° C. for about 15 minutes. Burley tobacco powder is added in an amount sufficient to form about 60% by weight based on the weight of the oral chewable tobacco product to the solution, which is then stirred for about 30 minutes until the mixture becomes a homogeneous paste. The paste is cooled to room temperature and glycerin in an amount sufficient to form about 5% by weight based on the weight of the oral tobacco product and sunflower oil in an amount sufficient to form about 5% by weight based on the weight of the oral tobacco product are added to the paste as softeners. The paste is formed into a dough. The dough is portioned to produce the oral chewable tobacco product.

Example 13

An oral chewable tobacco product is made by combining tobacco powder with a gum composition solution. The solution is prepared by dissolving polycaprolactone diol in an amount sufficient to form about 15% by weight based on the weight of the oral chewable tobacco product in 50 mL ethanol to form a solution. The solution is stirred at 60° C. for about 15 minutes. Burley tobacco powder is added in an amount sufficient to form about 60% by weight based on the weight of the oral chewable tobacco product to the solution, which is then stirred for about 30 minutes until the mixture becomes a homogeneous paste. The paste is cooled to room temperature and polyethylene glycol-block-polypropylene glycol-block-polyethylene glycol in an amount sufficient to form about 15% by weight based on the weight of the oral chewable tobacco product and propylene glycol in an amount sufficient to form 10% by weight based on the weight of the oral chewable tobacco product are added to the paste as softeners. The paste is formed into a dough. The dough is portioned to produce the oral chewable tobacco product.

Example 14

An oral chewable tobacco product is made by combining tobacco powder with a gum composition solution. The solution is prepared by dissolving corn zein in an amount sufficient to form about 12% by weight based on the weight of the oral chewable tobacco product and lecithin in an amount sufficient to form about 12% by weight based on the weight of the oral chewable tobacco product in 50 mL ethanol to form a solution. The solution is stirred at 60° C. for about 15 minutes. Burley tobacco powder is added in an amount sufficient to form about 60% by weight based on the weight of the oral chewable tobacco product to the solution, which is then stirred for about 30 minutes until the mixture becomes a homogeneous paste. The paste is cooled to room temperature and propylene glycol in an amount sufficient to form about 9.6% by weight based on the weight of the oral chewable tobacco product, distilled monoglycerides in an amount sufficient to form about 4.8% by weight based on the weight of the oral chewable tobacco product and lactic acid esters of mono- and di-glycerides in an amount sufficient to form about 1.6% by weight based on the weight of the oral chewable tobacco product are added to the paste as softeners to form a dough. The dough is portioned to produce the oral chewable tobacco product.

In constructing product in accordance with the examples, it is preferred that the tobacco powder be smaller than about 400 mesh.

Also provided is a method of making an oral chewable tobacco product t. The method includes dissolving an at least partially biodegradable and/or at least partially water soluble polymer in a solvent to form a solution, adding tobacco powder to the solution, stirring the solution to form a paste, adding a softener to the paste, forming a dough from the paste and portioning the dough to form a pre-portioned oral chewable tobacco product. Preferably, the tobacco powder is added in an amount sufficient to form at least about 60% by weight based on the weight of the oral chewable tobacco product so as to maintain the tobacco flavor within the oral chewable tobacco product. Also preferably, the solution is heated to a temperature of about 40° C. to about 80° C. and the solution is stirred for about 15 to about 45 minutes. In a preferred embodiment, the solvent is ethanol.

As shown in Table 1, oral chewable tobacco products and/or gum compositions formed using high amounts of substantially insoluble gum compositions including natural and/or synthetic elastomers do not disintegrate as compared to oral chewable tobacco products and gum compositions formed as described herein and including tobacco material in an amount sufficient to form about 30% to about 70% by weight based on the weight of the oral chewable tobacco product and an at least partially biodegradable and/or at least partially water soluble gum composition in an amount sufficient to form about 70% to about 30% by weight based on the weight of the oral chewable tobacco product. Each 1 g sample was placed in 25 mL deionized water at a temperature of about 40° C.

TABLE 1

| Sample | Disintegration Time | Shape of Sample after Disintegration Time |
| --- | --- | --- |
| 9% Tobacco, 10% glycerin and 81% substantially insoluble gum composition | Did not disintegrate | Maintains shape |
| 19% tobacco, 6% glycerin and 75% substantially insoluble gum composition | Did not disintegrate | Maintains shape |
| 38% tobacco, 6% glycerin and 56% substantially insoluble gum composition | Partial disintegration in 30 minutes | Powder remains, some tobacco dissolved in water |
| 38% tobacco, 6% polyethylene glycol-block-polypropylene glycol-block-polyethylene glycol and 56% substantially insoluble gum composition | Partial disintegration in 30 minutes | Powder remains, some tobacco dissolved in water |
| 33.5% corn zein, 33.5% lecithin, 22% propylene glycol and 11% glycerides | More than 10 hours | Major portion of sample disintegrates |
| 60% tobacco, 13% corn zein, 13% lecithin, 10% propylene glycol and 4% glycerides (see Example 10) | 1 hour | Fully disintegrates |

As shown in Table 1, by reducing the amount of substantially water insoluble gum composition used and increasing the amount of tobacco material used, substantially water insoluble gum compositions including tobacco can disintegrate at least partially over time. However, substantially water insoluble gum compositions, when included in a majority amount do not disintegrate. In contrast, the gum composition described herein substantially disintegrates even when no tobacco is included. Samples including the gum compositions described herein and including a majority amount of tobacco disintegrate quickly and substantially.

In this specification, the word "about" is often used in connection with numerical values to indicate that mathematical precision of such values is not intended. Accordingly, it is intended that where "about" is used with a numerical value, a tolerance of 10% is contemplated for that numerical value.

While the foregoing describes in detail an oral chewable tobacco product that is disintegrable in the oral cavity and environmentally degradable with reference to a specific embodiment thereof, it will be apparent to one skilled in the art that various changes and modifications equivalents to the oral chewable tobacco product and process steps may be employed, which do not materially depart from the spirit and scope of the invention. Accordingly, all such changes, modifications, and equivalents that fall within the spirit and scope of the invention as defined by the appended claims are intended to be encompassed thereby.

We claim:

1. An oral chewable tobacco product comprising:
  tobacco powder in an amount sufficient to form about 30% to about 70% by weight based on the weight of the oral tobacco product; and
  an at least partially environmentally biodegradable and at least partially water soluble gum composition in an amount sufficient to form about 70% to about 30% by weight based on the weight of the oral chewable tobacco product, the at least partially environmentally biodegradable and at least partially water soluble gum composition comprising:
    at least one environmentally biodegradable polymer included in an amount sufficient to form about 20% to about 95% by weight based on the weight of the gum composition, said at least one environmentally biodegradable polymer selected from the group consisting of polycaprolactone, polycaprolactone diol, polylactides, polyglycolides, and combinations thereof; and
    at least one softener in an amount sufficient to maintain the softness and pliability of the gum composition and form about 80% to about 5% by weight based on the weight of the gum composition,
  wherein the oral chewable tobacco product is chewable and disintegrable in an oral cavity of a user and/or substantially environmentally biodegrades and the oral chewable tobacco product is free of water insoluble polymers.

2. The oral chewable tobacco product of claim 1, further comprising at least one non-tobacco flavorant in an amount of less than about 5% by weight based on the weight of the oral chewable tobacco product.

3. The oral chewable tobacco product of claim 2, wherein said at least one non-tobacco flavorant is in the form of spray dried flavorants, essential oils, encapsulated flavorants, coacervated flavorants, colloidal encapsulated flavorants, suspensions, solutions and combinations thereof.

4. The oral chewable tobacco product of claim 1, wherein the oral chewable tobacco product is pre-portioned.

5. The oral chewable tobacco product of claim 1, wherein the oral chewable tobacco product weighs about 0.5 g to 4.0 g.

6. The oral chewable tobacco product of claim 1, wherein the oral chewable tobacco product ranges in size from about 0.05 inches to about 1.5 inches in height, about 0.5 inches to about 1.5 inches in width and about 0.5 to about 1.5 inches in length.

7. The oral chewable tobacco product of claim 1, wherein the at least one softener is selected from the group consisting of lactic acid esters of monoglycerides, citric acid esters of monoglycerides, succinic acid esters of monoglycerides, diacetyl tartaric acid esters of monoglycerides, calcium stearoyl di laciate, lecithin, sunflower oil, peanut oil and combinations thereof.

8. The oral chewable tobacco product of claim 1, wherein the tobacco powder has particles smaller than about 400 mesh.

9. The oral chewable tobacco product of claim 1, wherein said oral tobacco product further comprises at least one additive in an amount of less than about 5% by weight based on the weight of the oral chewable tobacco product, said at least one additive selected from the group consisting of (a) at least one vitamin, (b) at least one mineral, (c) at least one neutraceutical, (d) at least one amino acid, (e) at least one energizing agent, (f) at least one soothing agent, (g) at least one sweetener, (h) at least one coloring agent, (i) at least one chemesthesis agent, (j) at least one antioxidant and combinations thereof.

10. The oral chewable tobacco product of claim 1, wherein said oral chewable tobacco product substantially disintegrates in the oral cavity in a time period ranging from about 30 seconds to about 60 minutes.

11. The oral chewable tobacco product of claim 1, wherein said oral chewable tobacco product substantially biodegrades in less than about 30 days.

12. The oral tobacco product of claim 1, wherein said oral chewable tobacco product substantially biodegrades in less than about 20 days.

13. The oral chewable tobacco product of claim 1, wherein said oral chewable tobacco product substantially biodegrades in less than about 10 days.

14. A method of making the biodegradable oral chewable tobacco product of claim 1 comprising:
dissolving the biodegradable polymer in a solvent to form a solution;
adding the tobacco powder to the solution;
stirring the solution to form a paste;
adding the softener; and
forming a dough from the paste.

15. The method of claim 14, further comprising heating the solution to a temperature of about 40° C. to about 80° C.

16. The method of claim 15, further comprising portioning the dough to form a pre-portioned biodegradable oral chewable tobacco product.

17. The method of claim 14, wherein the solution is stirred for about 15 to about 45 minutes.

18. The method of claim 14, wherein said solvent is ethanol.

19. A method of making the biodegradable oral chewable tobacco product comprising:
tobacco powder in an amount sufficient to form about 30% to about 70% by weight based on the weight of the oral tobacco product; and
an at least partially environmentally biodegradable and at least partially water soluble gum composition in an amount sufficient to form about 70% to about 30% by weight based on the weight of the oral chewable tobacco product, the at least partially environmentally biodegradable and at least partially water soluble gum composition comprising:
at least one environmentally biodegradable polymer included in an amount sufficient to form about 20% to about 95% by weight based on the weight of the gum composition, said at least one environmentally biodegradable polymer selected from the group consisting of polycaprolactone, polycaprolactone diol, polylactides, polyglycolides, and combinations thereof; and
at least one softener in an amount sufficient to maintain the softness and pliability of the gum composition and form about 80% to about 5% by weight based on the weight of the gum composition,
wherein the oral chewable tobacco product is chewable and disintegrable in an oral cavity of a user and/or substantially environmentally biodegrades and the oral chewable tobacco product is free of water insoluble polymers, the method comprising:
dissolving a biodegradable polymer in a solvent to form a solution, wherein the solvent is ethanol;
adding tobacco powder to the solution;
heating the solution to a temperature of about 40° C. to about 80° C. for about 15 to about 45 minutes;
stirring the solution to form a paste;
adding a softener;
forming a dough from the paste; and
portioning the dough to form a pre-portioned biodegradable oral chewable tobacco product.

20. The method of claim 19, wherein the at least one softener is selected from the group consisting of lactic acid esters of monoglycerides, citric acid esters of monoglycerides, succinic acid esters of monoglycerides, diacetyl tartaric acid esters of monoglycerides, calcium stearoyl di laciate, lecithin, sunflower oil, peanut oil and combinations thereof.

* * * * *